(12) United States Patent
Collins

(10) Patent No.: US 11,097,762 B1
(45) Date of Patent: Aug. 24, 2021

(54) HANDLE EXTENSION FOR STROLLER

(71) Applicant: Ashley Collins, Lafayette, GA (US)

(72) Inventor: Ashley Collins, Lafayette, GA (US)

( * ) Notice: Subject to any disclaimer, the term of this patent is extended or adjusted under 35 U.S.C. 154(b) by 0 days.

(21) Appl. No.: 17/049,335

(22) PCT Filed: Jul. 9, 2020

(86) PCT No.: PCT/US2020/041401
§ 371 (c)(1),
(2) Date: Oct. 20, 2020

(87) PCT Pub. No.: WO2021/015956
PCT Pub. Date: Jan. 28, 2021

Related U.S. Application Data

(60) Provisional application No. 62/878,708, filed on Jul. 25, 2019.

(51) Int. Cl.
*B62B 9/20* (2006.01)

(52) U.S. Cl.
CPC ..................... *B62B 9/20* (2013.01)

(58) Field of Classification Search
CPC .......... B62B 9/20; B62K 21/12; B62K 21/16; B25G 1/04
See application file for complete search history.

(56) References Cited

U.S. PATENT DOCUMENTS

| | | | |
|---|---|---|---|
| 6,098,993 A * | 8/2000 | Beilinson | B62B 9/20 280/1.5 |
| 8,234,755 B1 * | 8/2012 | Brand | B25G 1/04 16/427 |
| 8,407,861 B1 | 4/2013 | Brand et al. | |
| 9,352,183 B2 * | 5/2016 | Quinn | A63B 21/4035 |
| 2003/0132614 A1 * | 7/2003 | Kreamer | A63B 69/0028 280/655.1 |
| 2003/0229966 A1 * | 12/2003 | Boice | B62B 9/20 16/110.1 |
| 2005/0246861 A1 | 11/2005 | Monrad | |
| 2006/0179969 A1 * | 8/2006 | Lin | B62K 21/12 74/551.1 |
| 2009/0302570 A1 | 12/2009 | Davis | |
| 2009/0306553 A1 | 12/2009 | Mulholland et al. | |
| 2010/0275723 A1 * | 11/2010 | Servet | B62K 21/16 74/551.1 |
| 2011/0215549 A1 * | 9/2011 | Plainfield | B62K 21/12 280/270 |
| 2011/0290067 A1 * | 12/2011 | Ahn | B62K 21/16 74/551.8 |
| 2017/0197682 A1 * | 7/2017 | Heder | B62K 11/14 |
| 2018/0273133 A1 * | 9/2018 | Warner | B62K 21/18 |
| 2019/0202522 A1 * | 7/2019 | Huang | B62K 21/18 |
| 2020/0102046 A1 * | 4/2020 | Bigard | B62K 21/125 |
| 2020/0207439 A1 * | 7/2020 | Dawe | B62K 3/005 |
| 2020/0276999 A1 * | 9/2020 | Fanelli | B62B 9/20 |

* cited by examiner

*Primary Examiner* — Erez Gurari
(74) *Attorney, Agent, or Firm* — Leyendecker & Lemire, LLC

(57) ABSTRACT

A handle extension for a stroller is described. Embodiments of the handle extension can be implemented to allow for the natural movement of arms of a user while pushing a stroller. Embodiments include a pair of handle extensions rotatably coupled to a stroller handlebar. The handle extensions can rotate about the stroller handlebar and include a means to allow for movement of a handle of the handle extension in addition to the handle extension rotating about the handlebar.

17 Claims, 6 Drawing Sheets

HANDLE EXTENSION FOR STROLLER

CROSS-REFERENCE TO RELATED APPLICATION

This application claims the benefit of U.S. Provisional Application No. 62/878,708, filed Jul. 25, 2019.

BACKGROUND

Many different types and sizes of strollers are currently available. Stroller designs have become customized for different activities and purposes. However, strollers usually have one of two different types of handles. A single handlebar spanning an entire width of the stroller or a pair of handles. Jogging strollers are designed to allow a user to engage in jogging while pushing a stroller and typically include a single handlebar. Umbrella strollers typically include a pair of handles located on either side of the stroller.

While these are great when pushing a stroller, they are often lacking in comfort and functionality when jogging or running. Since the handles/handlebars are stationary, a user typically alternates between holding the stroller when jogging with either hand to allow the other to move naturally. This can lead to dangerous situations where control of the stroller is compromised because the user is only using one hand. Alternatively, the user must change the natural movement of their arms to keep both hands on the handles/handlebar.

A handle including a means for a user to keep control of a stroller while also allowing for a natural movement of arms when jogging is needed.

DETAILED DESCRIPTION

Figure 1:
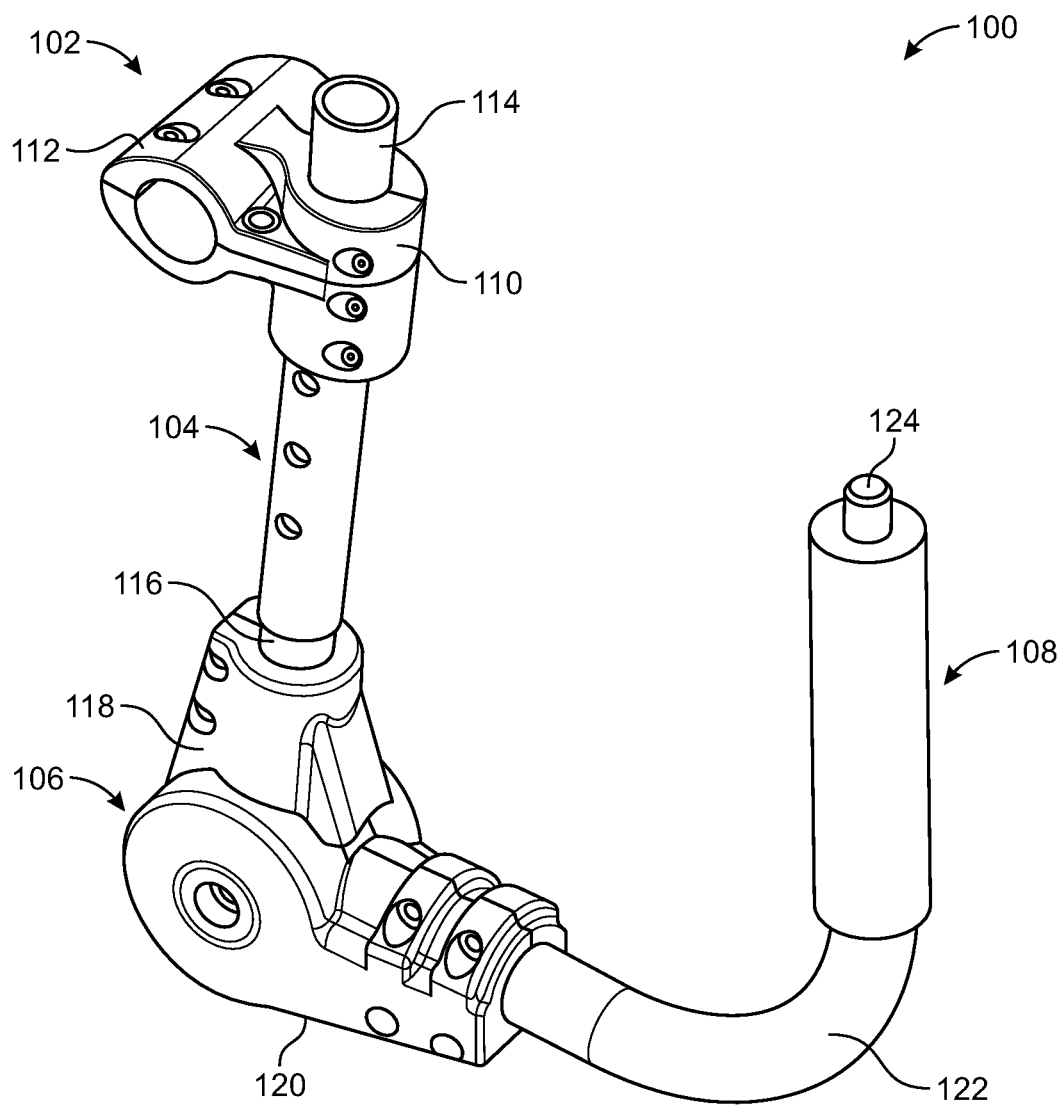
FIG. 1 is a perspective view of a handle extension according to one embodiment of the present invention.

Embodiments of the present invention include a handle extension for a stroller. In some embodiments, a pair of handle extensions can be implemented. The handle extension can be configured to move with a user as they move their arms while walking and/or jogging. Typically, the handle extension can be implemented with jogging strollers, however, the handle extension can be implemented with other strollers. The handle extension can be configured to removably couple to a normal handlebar of a jogging stroller and extend away from the stroller to a more comfortable position for a user to hold on to while using the stroller. In some embodiments, an overall length of the handle extension can be adjustable to suit different users.

Components of the handle extension can provide two different means of movement to allow for a natural arm movement when holding the handle extension. A first means can be provided by the handle extension being rotatably coupled to a stroller handlebar. The handle extension can be configured to rotate about the stroller handlebar where attached. A second means of movement can be provided by a rotating elbow joint located between a handle and a rod assembly of the handle extension. The two means of movement can allow for the natural movement of an arm while pushing a stroller.

In one embodiment, the handle extension can include, but is not limited to, a clamp assembly, a rod assembly, an elbow joint, and a handle. The clamp assembly can be implemented to removably and rotatably couple the handle extension to a handlebar of a stroller. The rod assembly can be implemented to adjust a length of the handle extension. A first end of the rod assembly can be coupled to the clamp assembly and a second end can be coupled to the elbow joint. The handle of the handle extension can be coupled to the elbow joint such that the handle may rotate in relation to the clamp assembly and the rod assembly.

The clamp assembly can be implemented to secure to a stroller handlebar and provide a first means of movement for the handle extension. Typically, the clamp assembly can include, but is not limited to, a first assembly clamp and a second assembly clamp. The first assembly clamp can be connected to the rod assembly and the second assembly clamp can be rotatably coupled to a stroller handlebar. Of note, the second assembly clamp can be configured to couple to varying sizes of handlebars. Typically, an interior of the second assembly clamp can be relatively smooth to allow for the second assembly clamp to rotate about a handlebar with minimal resistance. It is to be appreciated that embodiments are contemplated where a single assembly clamp is implemented. In such an embodiment, a portion of the rod assembly may be manufactured as part of the single assembly clamp. Embodiments are further contemplated where the second assembly clamp includes a non-rotatable coupling coupled to a handlebar and a freely rotating member rotatably coupled to the non-rotatable coupling and the rod assembly. For instance, the freely rotating member can rotate about the non-rotatable coupling instead of the stroller handlebar and the non-rotatable coupling can be coupled to the handlebar.

The rod assembly can be implemented to extend out from a stroller handlebar and couple to the aforementioned elbow joint. Typically, the rod assembly can be adjustable in length to increase or decrease an overall length of the handle extension. In one embodiment, the rod assembly can be telescoping and include spring buttons to allow for an adjustability of the rod assembly. Embodiments are contemplated where the rod assembly has a fixed length. Further, other means of providing an adjustable length for the rod assembly are contemplated and not outside a scope of the present invention.

In one embodiment, a first end of the rod assembly can be coupled to the first assembly clamp of the clamp assembly and a second end of the rod assembly can be coupled to the elbow joint. Although a spring button configuration is mentioned for the rod assembly, it is to be appreciated that other means of extending or shortening the rod assembly are contemplated. Embodiments are contemplated wherein the rod assembly can rotate relative to the clamp assembly, such that when not in use, the handle extension can be rotated 180 degrees. When rotated this way, the handle of the handle extension may be located underneath the stroller handlebar and out of the way. In one example, the first assembly clamp of the clamp assembly can be loosened and the rod assembly may be rotated. The first assembly clamp may then be tightened to keep the handle extension underneath the stroller.

The elbow joint can be implemented to provide a second means of movement for the handle extension. The elbow joint can include, but is not limited to, a first clamp and a second clamp. The first clamp can be coupled to the rod assembly and the second clamp can be coupled to the handle. In one embodiment, the second clamp can be rotatably coupled to the first clamp. Typically, the second clamp can be free to rotate in relation to the first clamp such that as a user is holding the handle, the handle can move with a natural movement of the user as they walk or run. The clamps of the elbow joint can rotate approximately 90 degrees in relation to one another. As can be appreciated, the handle can be effectively rotated in relation to the clamp assembly, and thus the stroller handlebar, via the elbow joint.

The handle can be implemented as a point of contact for a user with the handle extension. In one embodiment, the handle can have a substantially "L" shape. A first end (or proximal end) of the handle can be coupled to the second clamp of the elbow joint. In one embodiment, the handle can include an actuator (e.g., a push button) proximate a second end (or distal end) of the handle that can be implemented to lock the handle in-place in relation to the rod assembly. For instance, the push button can be configured to engage a locking mechanism of the elbow joint and stop the first and second clamps from rotating. In one embodiment, when the push button is depressed, the elbow joint can be locked. When the push button is released, the elbow joint can be free to rotate. It is to be appreciated that other configurations of the locking mechanism are contemplated and not outside a scope of the present invention. For instance, embodiments where the push button must be depressed to allow the clamps of the elbow joint to rotate are contemplated.

In a typical implementation, the handle extension can first be coupled to a stroller handlebar. As previously mentioned, the clamp assembly can be configured to couple to handlebars having varying diameters. In one instance, to couple the clamp assembly to the handlebar, a user may loosen fasteners connecting upper and lower members of the second assembly clamp such that the upper and lower members can be placed around the handlebar. Once the clamp assembly has been loosely coupled to the stroller handlebar, a user can move the handle extension to a preferred location on the stroller handlebar. As such, a user can move the handle extension about the handlebar to find a perfect orientation for said user. Once a preferred orientation is found, the user may tighten the clamp assembly in place. The clamp assembly can be coupled in place by tightening the fasteners and thus clamping the handlebar between the upper and lower members of the second assembly clamp. Of note, the second assembly clamp can be coupled to the handlebar such that the clamp assembly may still rotate freely about the handlebar. After the clamp assembly is in place, a user may extend the rod assembly to a preferred length. The rod assembly may be extended to lower the elbow joint, and thus extend the handle further from the stroller.

The clamp assembly allows the handle extension to effectively move in an up and down (and back and forth) motion and the elbow joint allows the handle to freely move in a back and forth (and up and down) motion. Combined, the user may keep their hand on the handle as they run with the handle able to follow the natural movement of the hand of the user. Of note, as a hand of the user moves up and down and back and forth, similar to an elliptical motion, the handle can move with the hand of the user. As can be appreciated, the person may keep their hand proximate the handle while running such that when they need press the push button, the push button is easily located. This can allow for the person to lock the handle and control the stroller while running more quickly. Further, since the handle extension extends out and away from the stroller, a user may more easily control the stroller when making a turn, as the handle extension provides more leverage.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

An Embodiment of a Handle Extension for a Stroller

Figure 2:
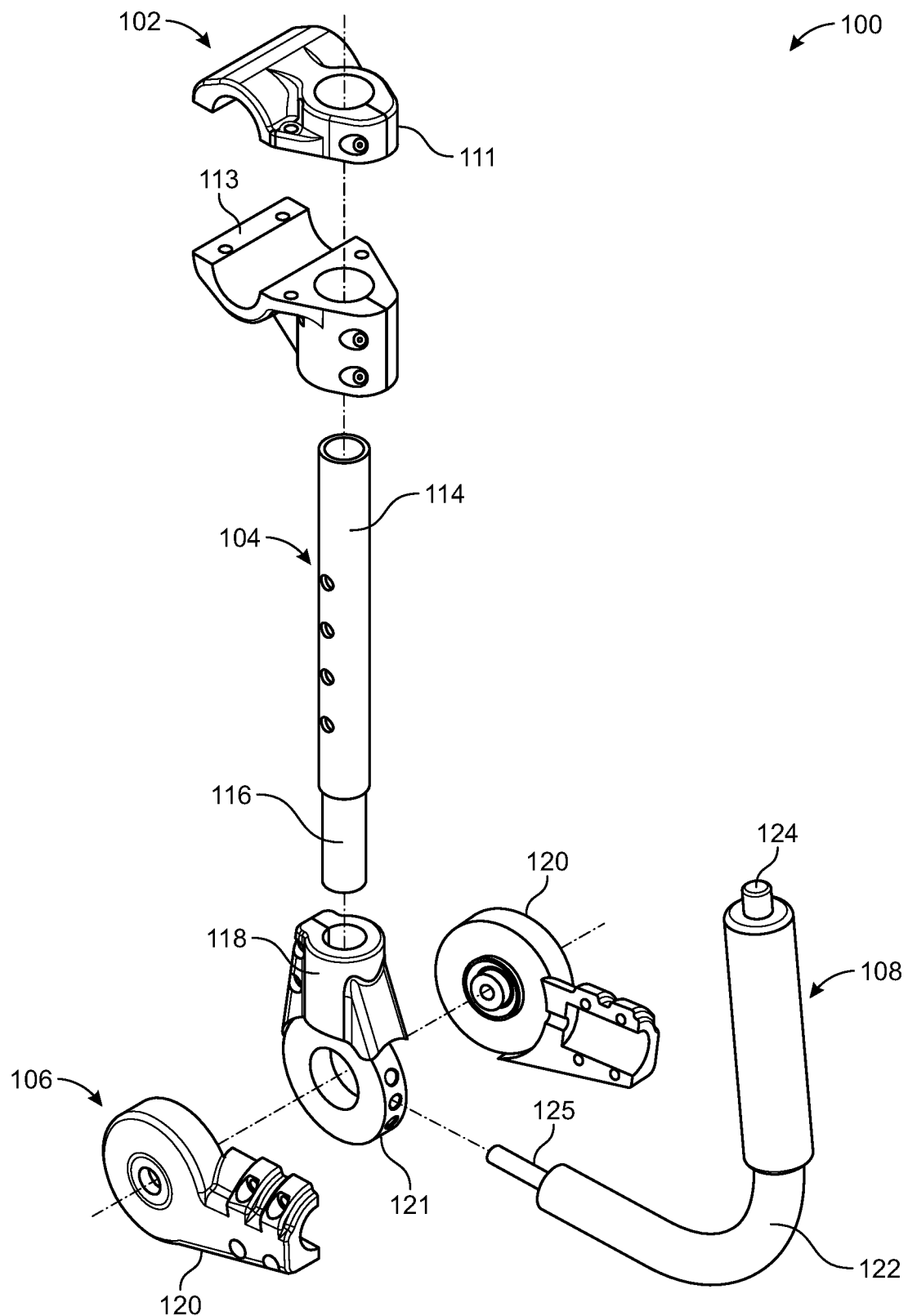
FIG. 2 is an exploded view of a handle extension according to one embodiment of the present invention.

Referring to FIG. 1, a perspective view of an embodiment 100 of a handle extension is illustrated. Referring to FIG. 2, an exploded view of the handle extension 100 is illustrated. The handle extension 100 can typically be implemented with a stroller and can be configured to move with a user to allow the user to move their arm in a normal movement while pushing the stroller. Typically, a pair of handle extensions 100 can be implemented, but a single handle extension 100 may also be implemented.

As shown generally in FIGS. 1-2, the handle extension 100 can include, but is not limited to, a clamp assembly 102, a rod assembly 104, an elbow joint 106, and a handle 108.

The clamp assembly 102 can be implemented to removably couple the handle extension 100 to a handlebar of a stroller. The clamp assembly 102 can typically include, but is not limited to, a first assembly clamp 110 and a second assembly clamp 112. The first assembly clamp 110 can be coupled to the rod assembly 104 and the second assembly clamp 112 can be configured to secure to a handlebar of a stroller. As shown generally in FIG. 1, a borehole formed by the first assembly clamp 110 can be oriented substantially perpendicular to a borehole formed by the second assembly clamp 112.

In some embodiments, as shown in FIG. 2, a first portion of the first assembly clamp 110 and a first portion of the second assembly clamp 112 can be manufactured to form a first piece 111. A second portion of the first assembly clamp 110 and a second portion of the second assembly clamp 112 can be manufactured to form a second piece 113. For instance, the first portions of the first assembly clamp 110 and the second assembly clamp 112 can be integral to one another. The second portions of the first assembly clamp 110 and the second assembly clamp 112 can be integral to one another. In such an embodiment, the first piece 111 and the second piece 113 may be manufactured from a single piece of material or into a single piece. For instance, the first piece 111 and the second piece 113 may be 3D printed. The first portion of the first assembly clamp 110 can be removably coupled to the second portion of the first assembly clamp 110. The first portion of the second assembly clamp 112 can be removably coupled to the second portion of the second assembly clamp 112. It is to be appreciated that other manufacturing processes can be implemented without exceeding a scope of this disclosure.

The rod assembly 104 can connect the clamp assembly 102 to the elbow joint 106. Typically, the rod assembly 104 can be adjustable in length, but embodiments are contemplated where the rod assembly 104 has a fixed length. A first end 114 of the rod assembly 104 can be coupled to the clamp assembly 102 via the first assembly clamp 110. In some instances, the first assembly clamp 110 can be loosened and the first end 114 of the rod assembly 104 can rotate in the first assembly clamp 110. Once the first end 114 is rotated approximately 180 degrees, the first assembly clamp 110 can be retightened. A second end 116 of the rod assembly 104 can be coupled to the elbow joint 106. As shown, the rod assembly 104 can be telescoping to adjust a length of the rod assembly 104. In one embodiment, spring buttons can be implemented to allow for an adjustability of the rod assembly 104. Other means for adjusting a length of the rod assembly 104 are contemplated and not outside a scope of this disclosure.

The elbow joint 106 can include, but is not limited to, a first clamp 118 and a second clamp 120. The second clamp 120 can be rotatably coupled to the first clamp 118. Generally, the second clamp 120 can rotate approximately 90 degrees in relation to the first clamp 118. The elbow joint 106 can provide a means for adjusting an orientation of the handle 108 in relation to a stroller handlebar. Typically, the clamp 120 can be free to rotate such that as a user is holding the handle 108, the handle 108 can move with a natural movement of the user as they walk or run. The second clamp 120 can be coupled to the handle 108. It is to be appreciated that other means of securing the handle to the elbow joint 106 are contemplated and not outside a scope of the present disclosure.

In one embodiment, the handle 108 can include a substantially "L" shaped member 122 and an actuator 124 (e.g., a push button) proximate an end of the handle 108. The push button 124 can be implemented to lock the handle 108 in-place in relation to the rod assembly 104 via the elbow joint 106. For instance, the push button 124 can be configured to lock a locking mechanism of the elbow joint 106. When the push button 124 is depressed, the elbow joint 106 can be locked and the second clamp 120 may be prohibited from rotating. When the push button 124 is released, the components of the elbow joint 106 can be free to rotate.

In one embodiment, as shown in FIG. 2, the first clamp 118 may include one or more receptacles 121 for receiving a rod 125 therein. Typically, the rod 125 can be stored inside the handle 108. When the push button 124 is depressed, the rod 125 can be pushed out and into one of the receptacles 121 to keep the second clamp 120 and the handle 108 from moving. The rod 125 may be tensioned inside the handle such that when the push button is released, the rod can be retracted back inside the handle 108 to allow the handle 108 to move. In some instances, the push button 124 and the rod 125 may be a single piece. In other instances, the push button 124 may be operatively coupled to the rod 125.

Figure 3:
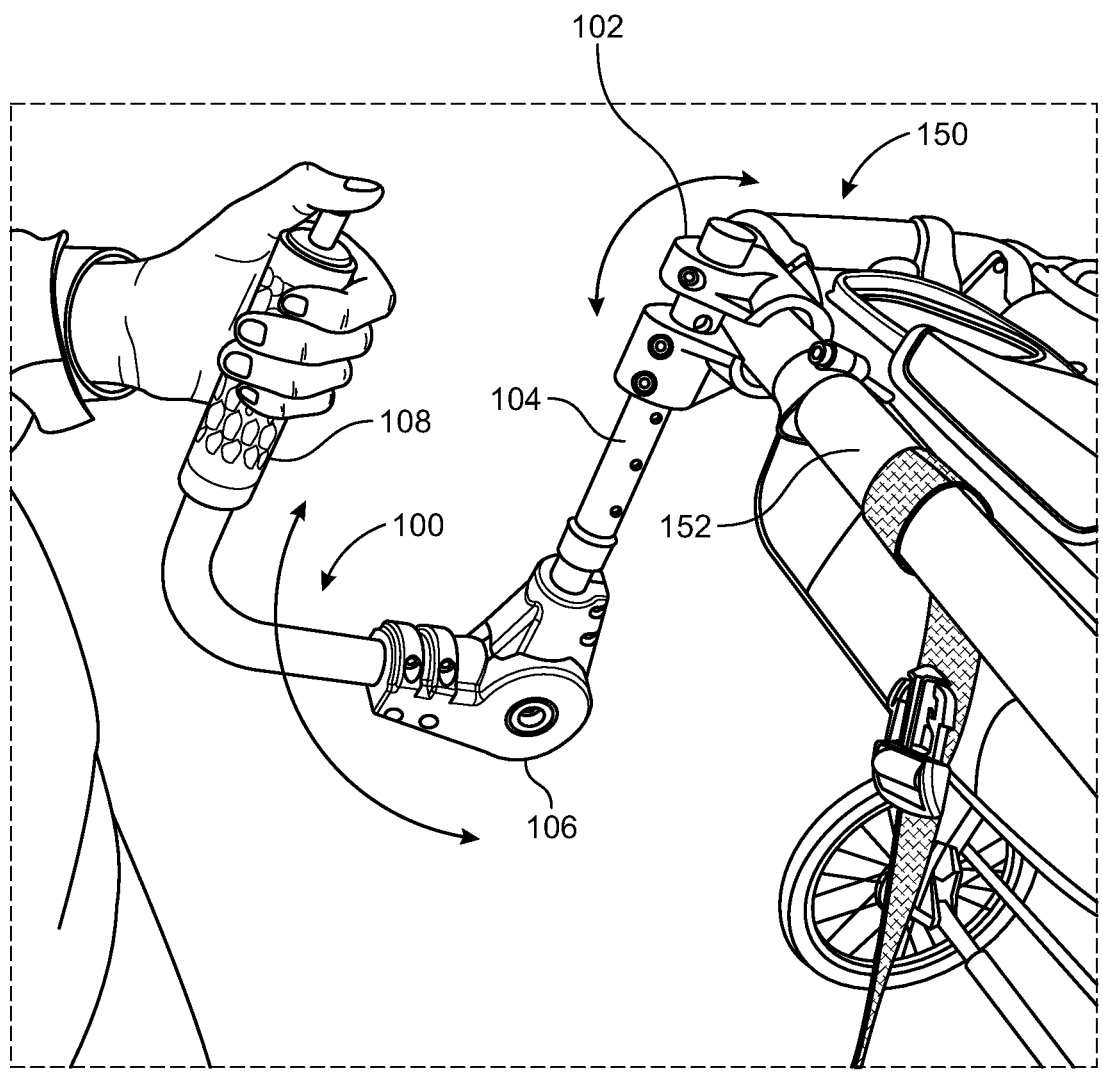
FIG. 3 is a perspective view of a handle extension coupled to a stroller handlebar according to one embodiment of the present invention.

Referring to FIG. 3, a perspective view of the handle extension 100 coupled to a stroller 150 is illustrated. As shown, the clamp assembly 102 can be coupled to a handlebar 152 of the stroller 150. The second assembly clamp 112 can be rotatably coupled to the handlebar 152 of the stroller 150. As shown, the clamp assembly 102 can be configured to rotate about the stroller handlebar 152. The rotation of the second assembly clamp 112 allows for a first means of movement of the handle extension 100. For instance, when the user moves their hand up or down when holding the handle 108, the handle extension 100 can rotate about the handlebar 152. The free movement of the elbow joint 106 provides a second means of movement for the handle extension 100. Of note, the first means of movement and the second means of movement can work simultaneously or individually.

Figure 4:
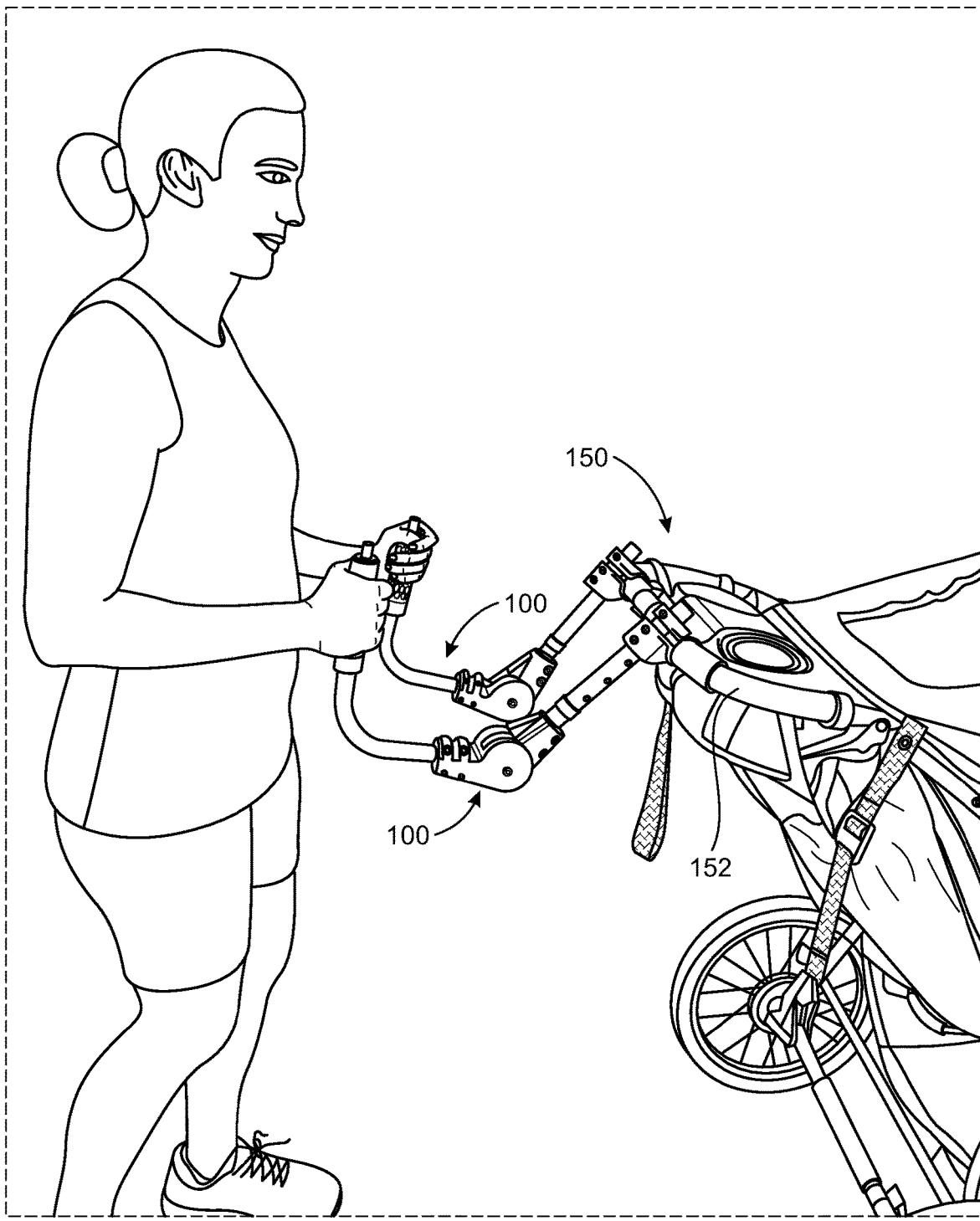
FIG. 4 is a perspective view of a pair of handle extensions coupled to a stroller handlebar according to one embodiment of the present invention.
Figure 5A:
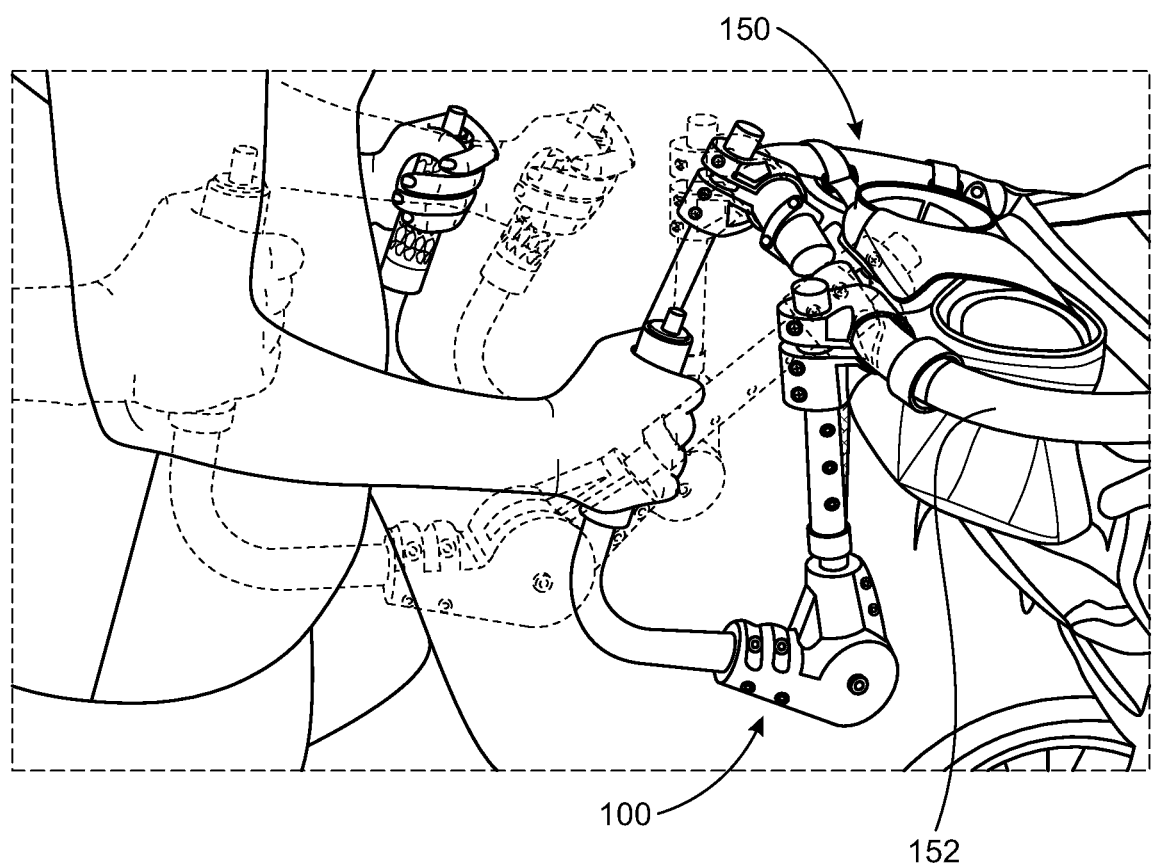
FIG. 5A is a detailed diagram of an example movement of a pair of handle extensions according to one embodiment of the present invention.
Figure 5B:
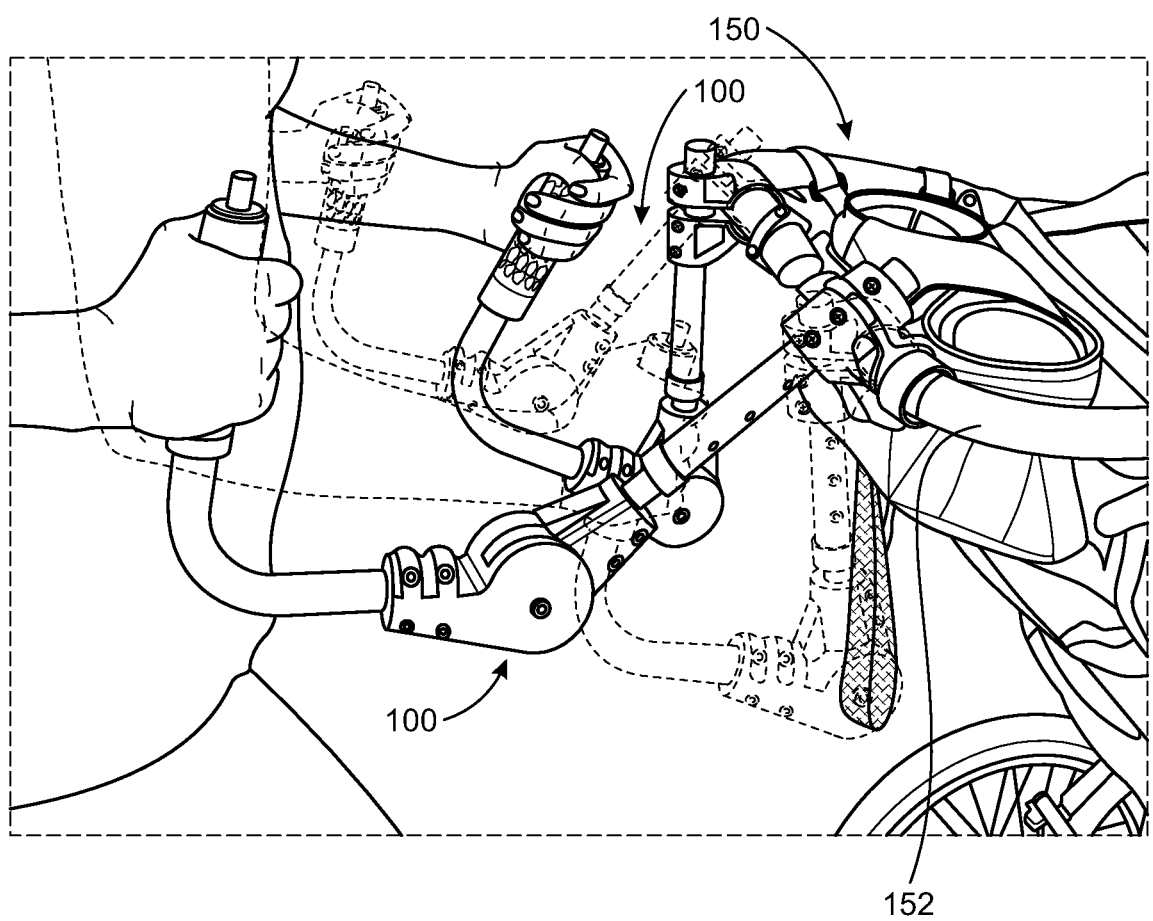
FIG. 5B is a detailed diagram of an example movement of a pair of handle extensions according to one embodiment of the present invention.

Referring to FIG. 4, a perspective view of a pair of handle extensions 100 coupled to the stroller 150 is illustrated. In some embodiments, a user may implement a pair of handle extensions 100 with a handle extension 100 for each hand of the user. As can be appreciated, by implementing the pair of handle extensions 100, the user may effectively have two hands on the stroller in case they need to let go with one hand, the other hand can still have contact with the stroller 150. As shown in FIGS. 5A-5B, each of the pair of handle extensions 100 can operate independently, allowing for the natural movement of arms of a user.

Referring to FIGS. 5A-5B, action views of the pair of handle extensions 100 moving in relation to the stroller 150 are illustrated. FIG. 5A includes a starting position of a pair of handle extensions 100 and an end position shown in dotted lines. FIG. 5B shows the end position of the pair of handle extensions 100 along with the starting position in dotted lines. As shown, the handle extensions 100 can rotate about the handlebar 152 and the handle 108 can move in relation to the rod assembly 104. The two means of movement of the handle extension 100 allow a user to hold on to the handle 108 while maintaining a natural arm movement. Generally, arms of a person can move up and down and back and forth while moving. The handle extension 100 can be configured to allow for this movement, as shown generally in FIGS. 5A-5B. As previously mentioned, the handle extensions 100 can each move independent of one another.

Referring to FIG. 5A, the handle extension 100 located on the right side is shown with a hand of the user close to the handlebar of the stroller 150. In this position, a longitudinal axis of the second clamp 120 can be approximately 90 degrees in relation to a longitudinal axis of the first clamp 118. The rod assembly 104 can be located near the handlebar. As the user moves their arm back, the handle 108 can move with the hand of the user. In an extended position, the clamp assembly 102 can be rotated about the handlebar as the rod assembly 104 moves from a vertical orientation to a more horizontal orientation. The second clamp 120 may also rotate away from the first clamp 118 such that the longitudinal axis is approximately 30 degrees from parallel with the longitudinal axis of the first clamp 118.

Referring to FIG. 5B, the end position of the movement of the pair of handle extensions 100 are illustrated. As shown in the end position, the handle extension 100 on the right side of the handlebar can be extended out with the rod assembly 104 rotated upwards via the clamp assembly 102 and the handle 108 extended out via the elbow joint 106.

ALTERNATIVE EMBODIMENTS AND VARIATIONS

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A handle extension comprising:
   a clamp assembly adapted to rotatably couple to a stroller handlebar;
   a rod assembly adjustable in length, a first end of the rod assembly being coupled to the clamp assembly;
   an elbow joint including (i) a first clamp coupled to a second end of the rod assembly, and (ii) a second clamp rotatably coupled to the first clamp;
   a locking mechanism adapted to prohibit the second clamp from rotating when the locking mechanism is engaged; and
   a handle being coupled to the second clamp and including an actuator to engage the locking mechanism.

2. The handle extension of claim 1, wherein the handle rotates approximately 90 degrees in relation to the rod assembly.

3. The handle extension of claim 1, wherein the second clamp of the elbow joint is prohibited from rotating when the actuator is depressed.

4. The handle extension of claim 1, wherein the clamp assembly includes:
   a first assembly clamp adapted to couple to the first end of the rod assembly; and
   a second assembly clamp adapted to couple to the stroller handlebar;
   wherein the first assembly clamp and the second assembly clamp are oriented substantially perpendicular to one another.

5. The handle extension of claim 4, wherein the first assembly clamp and the second assembly clamp are integral to one another.

6. The handle extension of claim 1, wherein the handle has a substantially "L" shape.

7. The handle extension of claim 1, wherein the rod assembly is telescoping.

8. A method for implementing a handle extension, the method comprising:
   providing a handle extension, the handle extension including:
   a clamp assembly;
   a rod assembly adjustable in length, a first end of the rod assembly being coupled to the clamp assembly;
   an elbow joint including (i) a first clamp coupled to a second end of the rod assembly, and (ii) a second clamp rotatably coupled to the first clamp; and
   a handle being coupled to the second clamp;
   securing the clamp assembly to a handlebar of a stroller, the handle extension being able to rotate about the handlebar; and
   pushing the stroller via the handle extension;
   wherein the clamp assembly rotates around the handlebar as the stroller is pushed.

9. The method of claim 8, the method further including the steps of:
   extending the rod assembly to a desired length; and
   securing the rod assembly in the desired length.

10. The method of claim 8, the method further including the step of:
    rotating the rod assembly in the clamp assembly such that the handle is located underneath the stroller handlebar.

11. The method of claim 8, the clamp assembly including:
    a first assembly clamp adapted to couple to the first end of the rod assembly; and
    a second assembly clamp adapted to rotatably couple to the stroller handlebar;
    wherein the first assembly clamp and the second assembly clamp are oriented substantially perpendicular to one another.

12. The method of claim 8, the handle extension further including (i) a locking mechanism, and (ii) an actuator located in the handle adapted to engage the locking mechanism.

13. The method of claim 12, the method further including the step of:
    depressing the actuator to engage the locking mechanism to stop the second clamp of the elbow joint from rotating.

14. The method of claim 8, wherein the second clamp of the elbow joint rotates back and forth in relation to the first clamp as the stroller is pushed.

15. A handle extension comprising:
    a handle having a substantially "L" shape;
    an elbow joint including a first clamp rotatably coupled to a second clamp, the handle being coupled to the first clamp;
    a rod assembly adjustable in length, a first end of the rod assembly being coupled to the second clamp of the elbow joint; and
    a clamp assembly including:
    a first assembly clamp coupled to a second end of the rod assembly; and
    a second assembly clamp adapted to rotatably couple to a stroller handlebar;
    wherein (i) a borehole formed by the first assembly clamp is oriented substantially perpendicular to a borehole formed by the second assembly clamp, (ii) the first assembly clamp is secured to the second assembly clamp, and (iii) the second assembly clamp is adapted to secure to handlebars having different diameters.

16. The handle extension of claim 15, wherein (i) the first assembly clamp includes a first portion and a second portion, (ii) the second assembly clamp includes a first portion and a second portion, (iii) the first portion of the first assembly clamp and the first portion of the second assembly clamp are integral to one another, and (iv) the second portion of the first assembly clamp and the second portion of the second assembly clamp are integral to one another.

17. The handle extension of claim 16, wherein (i) the first portion of the first assembly clamp is coupled to the second portion of the first assembly clamp; and (ii) the first portion of the second assembly clamp is coupled to the second portion of the second assembly clamp.

* * * * *